UNITED STATES PATENT OFFICE.

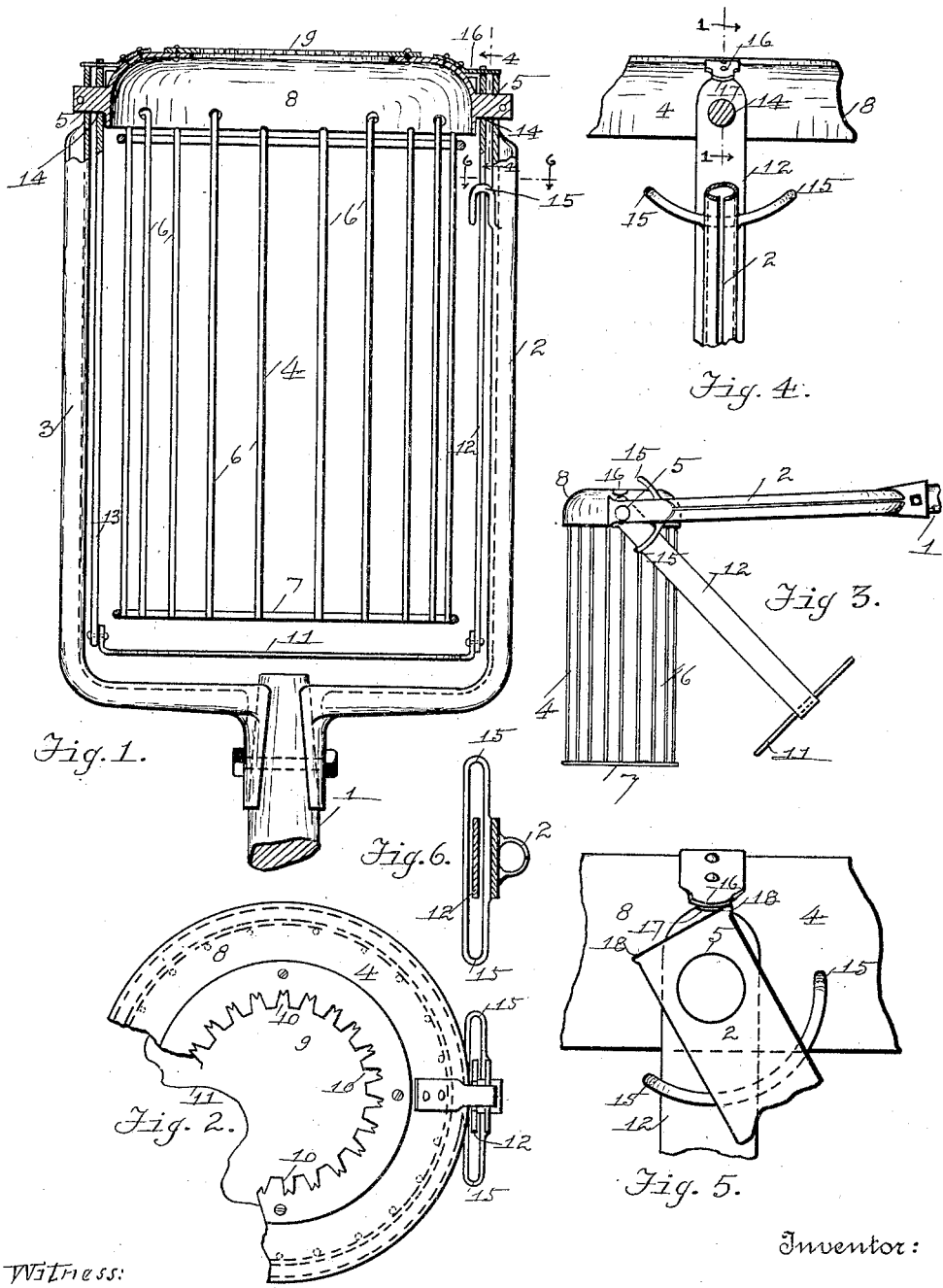

THEODORE C. SCHULTZE, OF GRAND RAPIDS, MICHIGAN, ASSIGNOR TO HERMAN LUCAS, OF GRAND RAPIDS, MICHIGAN.

FRUIT-PICKER.

1,373,531. Specification of Letters Patent. Patented Apr. 5, 1921.

Application filed January 10, 1920. Serial No. 350,596.

*To all whom it may concern:*

Be it known that I, THEODORE C. SCHULTZE, a citizen of the United States, residing at Grand Rapids, in the county of Kent and State of Michigan, have invented new and useful Improvements in Fruit-Pickers, of which the following is a specification.

The present invention relates to fruit pickers; and its general object is to provide an improved device for picking apples and the like from the trees; a more particular object is to provide such a device having a fruit container which may be readily emptied; a further and more particular object is to provide such a device having a container comprising an open-bottom body member swingable on a supporting handle and a bottom member swingable with the body of the container during a portion only of said body member's swinging movement; a further and more particular object is to provide releasable means for locking the body member of the container and the bottom member together during their combined movement; a further and more particular object is to provide such a device having means for releasing such locking means at the limit of said combined movement.

These and any other objects hereinafter appearing are attained by, and the invention finds preferable embodiment in, the structure hereinafter particularly described and illustrated by the accompanying drawings, in which:—

Figure 1 is a front view of my fruit picker, all the parts being shown in upright position, and the upper portion being shown in vertical section taken on a plane corresponding to line 1—1 of Fig. 4;

Fig. 2 is a fragmentary top plan view thereof;

Fig. 3 is a side view of the same (reduced), showing the supporting handle in horizontal position and the bottom in the position in which the fruit is emptied from the container;

Fig. 4 is a view of certain parts in vertical section taken on a plane corresponding to line 4—4 of Fig. 1;

Fig. 5 is a side view of parts of the upper portion of the fruit picker; and

Fig. 6 is a view of certain parts in horizontal section taken on a plane corresponding to line 6—6 of Fig. 1.

In the embodiment of the invention chosen for illustration by the drawings and for detailed description in the body of this specification, my fruit picker has a support or handle 1 long enough to enable the operator, while standing on the ground, to reach the fruit on the tree. This support has arms 2, 3 on whose upper ends the fruit receiver and container, designated generally 4, is swingably mounted at 5 on an axis above the container's center of gravity. This container 4 has a circumferential side or body member, preferably formed by vertically extending members, the wires 6, whose lower ends are secured as to the ring 7 and whose upper ends are secured to a top member 8 having a circular opening 9 therethrough, a plurality of radial slots 10 extending around said opening and having sides converging toward the bottoms of the slots and sharpened to provide cutting edges for severing the stems of the fruit to remove the fruit from the tree. The container 4 has also a bottom member 11 adapted to close the open bottom of the body member of the container during the picking of the fruit, and being mounted by its arms 12, 13, swingably on the support 1 on an axis 14 above the bottom member's center of gravity. By reason of the container's body member's mounting on its axis 5 it is swingable to positions such as are shown in Fig. 3, in which the supporting handle 1 is approximately horizontal while the longitudinal axis of the body member of the container 4 remains vertical. By reason of the bottom member's mounting on its axis 14, it is swingable with the body member of the container, but the swinging movement of the bottom member 11 is limited as by stops 15, as shown in Fig. 3, to that portion of the container's body member's swinging movement which is adjacent to the support. It will thus be seen that during the bottom member's swinging movement it moves with the body member of the container in its swinging movement, and that the body member of the container and the bottom member may be swung interrelatively by hand or otherwise: In order however that they may positively swing together within the limit of the bottom member's swinging movement, a locking means, as the catch or leaf spring 16 secured to the body member of the container is provided, whose outer extremity presses into holding engagement with a suitable keeper, the depression 17 in the arm 12 of the bottom member 11. This catch 16 however is released from the keeper 17 by the supporting handle 1 when the same is lowered sufficiently, such support having means at its upper end, as the cam surfaces 18 either of which engages the extremity of the catch 16 and lifts it from the keeper 17, such lifting engagement occurring approximately at the limit of the bottom member's swinging movement. The weight of the body member of the container and the fruit therein when said body member is swung outwardly away from the support sufficiently, overcomes the pressure of the spring catch 16.

My fruit picker is operated in the following manner: The operator holds the supporting handle approximately vertically, and engages the stem of the fruit in a cutting slot 10; when the stem is thus severed or broken the fruit falls into the container and on the bottom member 11. The supporting handle may be inclined from the vertical sufficiently to enable the operator to reach from the same ground position, fruit in different positions on the tree, the bottom member 11 swinging with the body member of the container during such movements. When however, the container has been sufficiently filled, the device is lowered, its parts now occupying a position such as is shown in Fig. 3, in which position the swinging movement of the bottom member 11 has been limited by a stop 15; and the container's body member's swinging movement having continued beyond the limit of the swinging movement of the bottom member 11, the fruit falls through the open-bottom body member of the container to the ground.

The invention being intended to be pointed out in the claims, is not to be limited to or by details of construction of the particular embodiment thereof shown by the drawings or hereinbefore described.

I claim:

1. In a device of the character described; a support; a container having fruit-picking means, and comprising an open-bottom body member swingable on the support and a bottom member swingable with said body member and also relatively thereto.

2. In a device of the character described; a support; a container having fruit-picking means, and comprising an open-bottom body member having a swingable movement on the support and a bottom member having a swingable movement with the body member limited to that portion of the body member's said movement in which the body member's lower end is adjacent the support.

3. In a device of the character described; a support; a container having fruit-picking means, and comprising an open-bottom body member having a swinging movement on the support on an axis above the body member's center of gravity and a bottom member having a swinging movement with the body member on an axis above the bottom member's center of gravity, limited to that portion of the body member's said movement in which the body member's lower end is adjacent the support.

4. In a device of the character described; a support; a container having fruit-picking means, and comprising an open-bottom body member having a swinging movement on the support and a bottom member having a swinging movement with the body member limited to that portion of the body member's said movement in which the body member's lower end is adjacent the support; means for locking the body member and the bottom member together.

5. In a device of the character described; a support; a container having fruit-picking means, and comprising an open-bottom body member having a swinging movement on the support and a bottom member having a swinging movement with the body member limited to that portion of the body member's said movement in which the body member's lower end is adjacent the support; means for locking the body member and the bottom member together; means for releasing said locking means, operable by the support at the limit of the bottom member's swinging movement.

6. In a device of the character described; a support; a container having fruit-picking means, and comprising an open-bottom body member having a swinging movement on the support and a bottom member having a swinging movement with the body member limited to that portion of the body member's said movement in which the body member's lower end is adjacent the support; a catch adapted to lock the body member and the bottom member together and carried by one of them; a keeper carried by the other and adapted to lockingly engage the catch; means carried by the support and adapted to engage the catch to release the same from the keeper and operable by the support in that interrelatively angular position of the support and the container which registers with the limit of the bottom's swinging movement.

In testimony whereof I have hereunto set my hand at Grand Rapids, Michigan, this 7th day of January, 1920.

THEODORE C. SCHULTZE.